United States Patent
Cordes

[15] 3,636,999
[45] Jan. 25, 1972

[54] GARLIC BULB APPENDAGE REMOVER

[72] Inventor: Henry P. Cordes, Vacaville, Calif.

[73] Assignee: Basic Vegetable Products Inc., San Francisco, Calif.

[22] Filed: July 7, 1969

[21] Appl. No.: 839,364

[52] U.S. Cl. ................................................146/81, 146/55
[51] Int. Cl. .......................................................A23n 15/04
[58] Field of Search .......................................146/81, 83, 55

[56] References Cited

UNITED STATES PATENTS

| | | | |
|---|---|---|---|
| 1,835,190 | 12/1931 | Stansbury | 146/55 |
| 2,927,616 | 3/1960 | Bruner | 146/83 |
| 3,122,187 | 2/1964 | Morgan | 146/55 |
| 3,230,990 | 1/1966 | Van Der Vijver | 146/83 |

Primary Examiner—Willie G. Abercrombie
Attorney—Townsend & Townsend

[57] ABSTRACT

Apparatus for pulling tops and root tendrils from garlic bulbs. Multiple sets of opposed rolls with firm resilient surfaces engage the protruding tops and roots of gently rotating bulbs and remove them by pulling regardless of the stage of the maturity of the garlic, to expose inner portions of the bulb thereby preparing the bulb for further processing or marketing. Treatment times and conditions are widely variable allowing optimum treatment on all types of feedstock encountered.

6 Claims, 3 Drawing Figures

INVENTOR.
HENRY P. CORDES
BY Townsend and Townsend
ATTORNEYS

GARLIC BULB APPENDAGE REMOVER

BACKGROUND OF THE INVENTION

1. Field of the Invention

The invention relates to the treatment of garlic bulbs dug from the ground to remove undesirable fractions such as stems and root tendrils as well as dirt clods putting the bulbs in condition for sale or further processing.

2. Description of the Prior Art

The known prior art on the removal of vegetable tops such as beet and onion tops is extensive. Each known apparatus involves means arranging the vegetable in a position where the top can be cut, trimmed, severed or amputated. This is accomplished by knives or by shearing action between two metal surfaces—one of which is normally circular and one pointed or angular. There is very little known prior art specific for the removal of tops from garlic bulbs. U.S. Pat. No. 3,154,124 is specific for garlic and involves gripping each individual bulb mechanically and severing the ends with knives. Common practice in preparing garlic bulbs for processing or market has been to hand cut both the tops and root tendrils with shears. This costly procedure has been tolerated because conventional vegetable toppers bruise garlic bulbs severely and often break them apart decreasing their usefulness. Furthermore, currently used garlic toppers are not completely satisfactory with respect to bulbs that have immature tops or mature tops rendered pliable by high humidity conditions.

SUMMARY OF THE INVENTION

The invention comprises multiple pairs of rolls and mechanism for revolving the rolls of each pair in opposite directions. One roll of each pair has a hard but resilient surface with uniform depressions along its length. The opposing roll has a spirally positioned resilient band which presses across the depressions in the first mentioned roll with a force sufficient to cause some distortion at the contact points. A large number of such pairs of rolls are mounted in a circular frame which slowly turns so as to move the roll pairs in a circular path. Flaps with resilient projections are mounted above the path of rolls; the resilient projections depend into the path and serve repeatedly to reorient the position of the garlic bulbs on the revolving rolls. The mechanism which revolves the rolls of each individual pair of rolls can be engaged or disengaged during any section of the circular path of travel thus providing one or more inspection stations where the rolls bearing the garlic bulbs pass through the section but are stationary as to rotation during the passage. This allows hand removal of foreign objects such as rocks or hard dirt clods or of defective garlic bulbs without danger to the inspectors. The ability to disengage selectively the roll rotation drive mechanism affords flexibility of operation in that it allows roll pairs to be in rotational operation at any desired location or locations in the circular path. Such flexibility permits prolonged treatment of feedstock that requires long treatment and shortened treatment for feedstock with respect to which this proves to be adequate. Just prior to 350° rotation from an infeed point, the treated bulbs are removed from the circular path of roll pairs.

The roll contours and roll position are designed to exert a gentle and positive pulling action on the tops and root tendrils of the garlic bulbs when they are caught between the contact points of the slowly rotating rolls. With rotation, the pulling pressure increases without cutting action until the top and the outer skin adjacent to the top is pulled loose from the bulb, or the root tendrils are pulled from the root plate. Such top removal exposes the interior of the garlic bulbs which consists of about 4–40 cloves, each of which is connected to the root plate. For further processing such as dehydration, garlic bulbs must be thoroughly cured before the individual cloves can be readily broken away from the root plate. Garlic bulbs topped by prior art toppers or even those topped by hand are still tightly sealed and require many days of optimum curing before the bulbs can be cracked apart without severe damage to the individual cloves. Although the root tendrils do not have to be removed for rapid curing, the invention does remove this fraction, a desirable feature because the root tendrils hold soil particles, detract from the appearance of garlic which is to be marketed, and cause functional problems in subsequent steps of processing. Conventional toppers such as are used on onions not only cause severe bruising of the exterior cloves, but will not function on immature tops or tops that are mature but have become pliable because of high humidity. The present invention works as well on such moist tops since they do not shatter when pulling pressure is applied.

In known prior art practice mechanical topping could be performed efficiently only on garlic with dry mature tops. It should be pointed out that onions and garlic although of the same family are radically different in construction. The top of an onion consists of the uppermost part of each layer of the onion. Efficient topping of onions must be done by cutting action; in fact in U.S. Pat. No. 2,978,333 the top removal is accompanied by a compression to seal the inner part of the onion from airborne infection. In contrast to onions, the tops of garlic are a continuation of the dry outer sheath of skin which surrounds the cloves, each of which is also protected by skin. The desired objectives of topping onions and garlic are exactly opposite and my invention recognizes this difference and is pointed toward the specific problems of topping garlic. My invention will, however, work efficiently on onion bulbs if the tops and root tendrils are mature and dry enough so that the gentle pulling action will separate the fragile ends without damage to the bulbs.

The above described objects, features, and advantages of the invention will be more apparent after referring to the following detailed description of an embodiment of the invention and the accompanying drawings.

DESCRIPTION OF THE PREFERRED EMBODIMENTS

Figure 1:
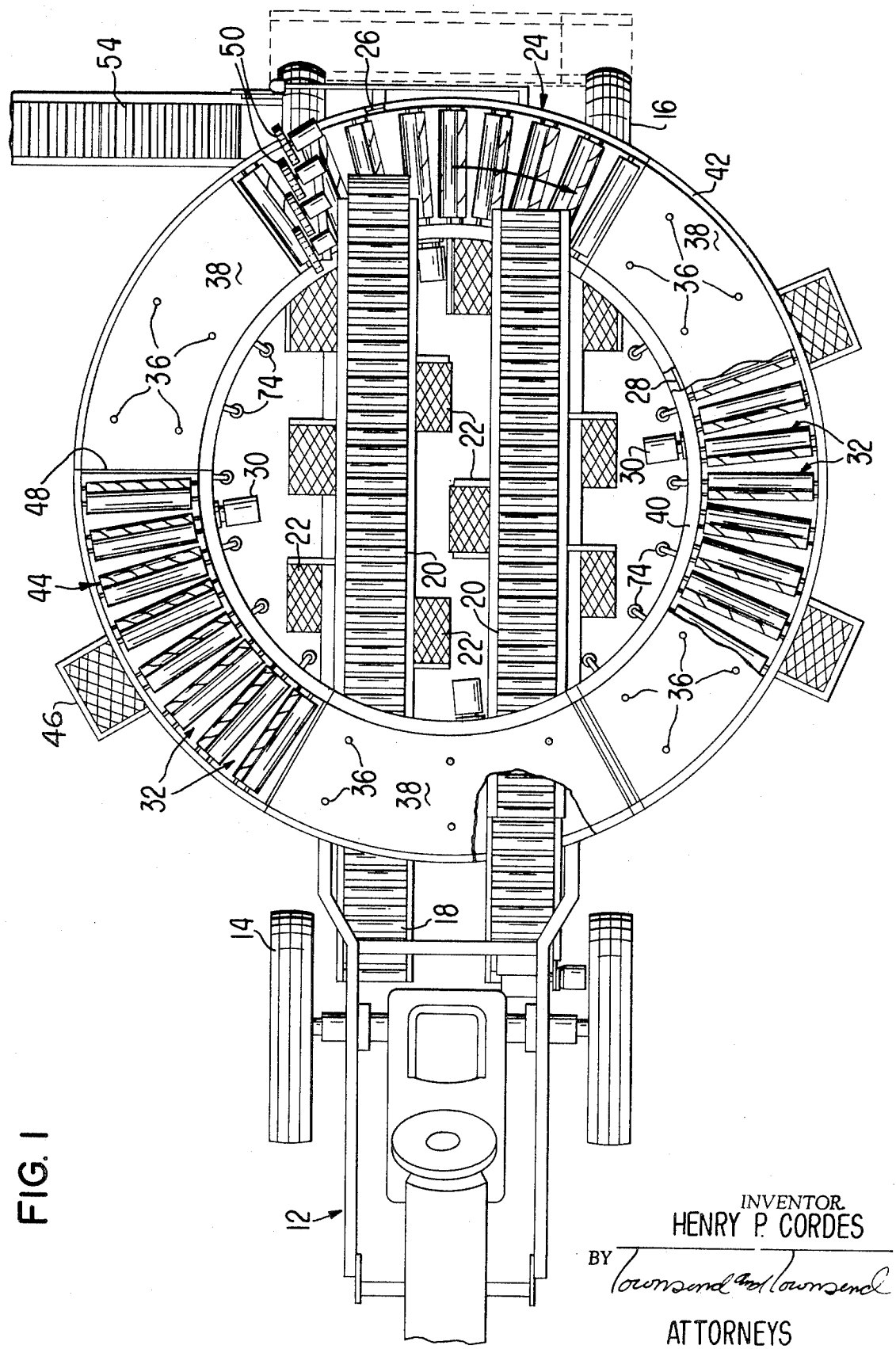
FIG. 1 is a top view of the invention shown as pulled by a tractor through a field of garlic.
Figure 3:
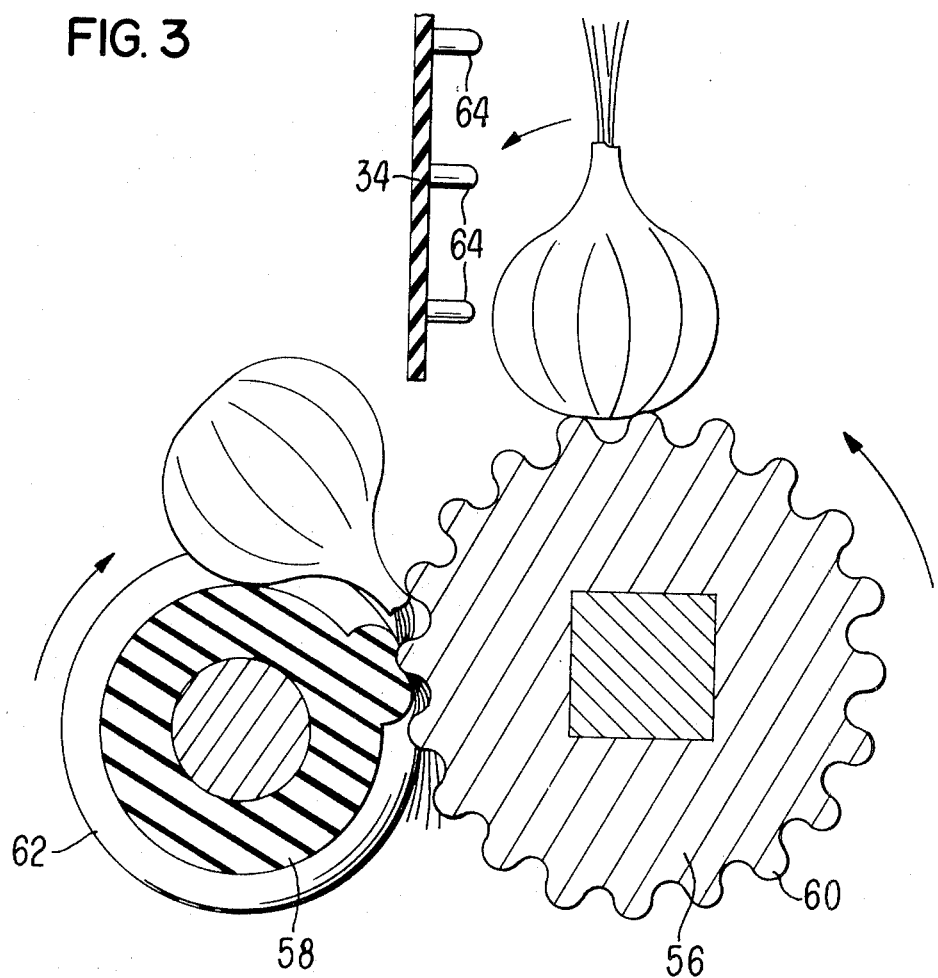
FIG. 3 is a cross section side view of a pair of stripping rollers taken from FIG. 2.

Referring to FIG. 1, the apparatus of the invention is drawn over a field surface by a power vehicle 12 that is supported on front wheels 14 and rear wheels 16. Garlic bulbs and adjacent soil are lifted from predug windrows by powered incline pickup chains 18 which include product supporting elements that are spaced apart to allow most of the free soil to fall through to the ground. The partially cleaned garlic bulbs are deposited on rearwardly inclined powered conveyors or grading tables 20 the flights of which are spaced to retain garlic bulbs and allow further free soil and other debris to fall through to the ground. Adjacent conveyors 20 are inspection platforms 22 spaced on both sides along their runs. The platforms support inspectors who remove defective bulbs or unwanted debris. Bulbs are discharged from conveyors 22 onto the top and root removing apparatus designated generally at 24. Such apparatus includes a circular frame formed by an outer wheel 26 and an inner wheel 28 which is rotating slowly in the direction of the indicating arrow in response to the action of one or more motors 30. The circular frame supports plural pairs of stripping rolls 32 which, as will appear, transport the bulbs around a circular path and effect removal of the tops and root tendrils from the bulbs. Rubber friction mats 34, FIG. 3, are suspended directly above the path of movement of the stripping roll pair by means of bolts 36 and serve to gently reorient the garlic bulbs which are riding on top of the stripping roll pairs. Cover plates 38 are supported on inner and outer frame members 40 and 42 and hold the friction mats in place and serve as a safety cover over the stripping rolls.

Area 44 represents one section of the circular path of travel where the stripping roll pairs are not engaged for rotation and serves as a safe inspection area where inspectors standing on platforms 46 can manually remove foreign material from the stripping rolls. Stripping roll rotation is again engaged at point 48 which is safely covered. Additional inspection areas can be created as desired by removing the covers 38 and disengaging the stripping roll rotation drive in that area. As the circular frame continues to turn, the treated garlic bulbs contact a series of staggered rotating flexible shunting brushes 50 which gently move the bulbs to the outside of the wheel and then discharge them to elevator 54 which conveys them to the mobile storage and transport device (not shown).

FIG. 3 shows a cross section end view of a pair of stripping rolls 32. Each pair includes a fluted roll 56 and a spiral roll 58. The rolls are supported close to one another so as to define a bulb-supporting pocket therebetween. In one apparatus designed according to this invention, roll 56 is 3½ inches in diameter and is composed of firm but resilient substance, e.g., rubber, with uniform protrusions 60 lengthwise of the roll to define flutes. Roll 58 is 2 inches in diameter with a spirally wound resilient strip 62 extending one-fourth inch from the roll surface and which is in compression contact with the roll 56. Strip 62 extends fully around the circumference of roll 58 to assure continuous driving contact between rolls 56 and 58, and preferably extends axially the full length of roll 58 so that the entire length is active to remove tops and root tendrils from the bulb. Garlic tops and root tendrils are caught in these contact areas and held tightly and pulled from the garlic bulbs as the rolls rotate.

Figure 2:
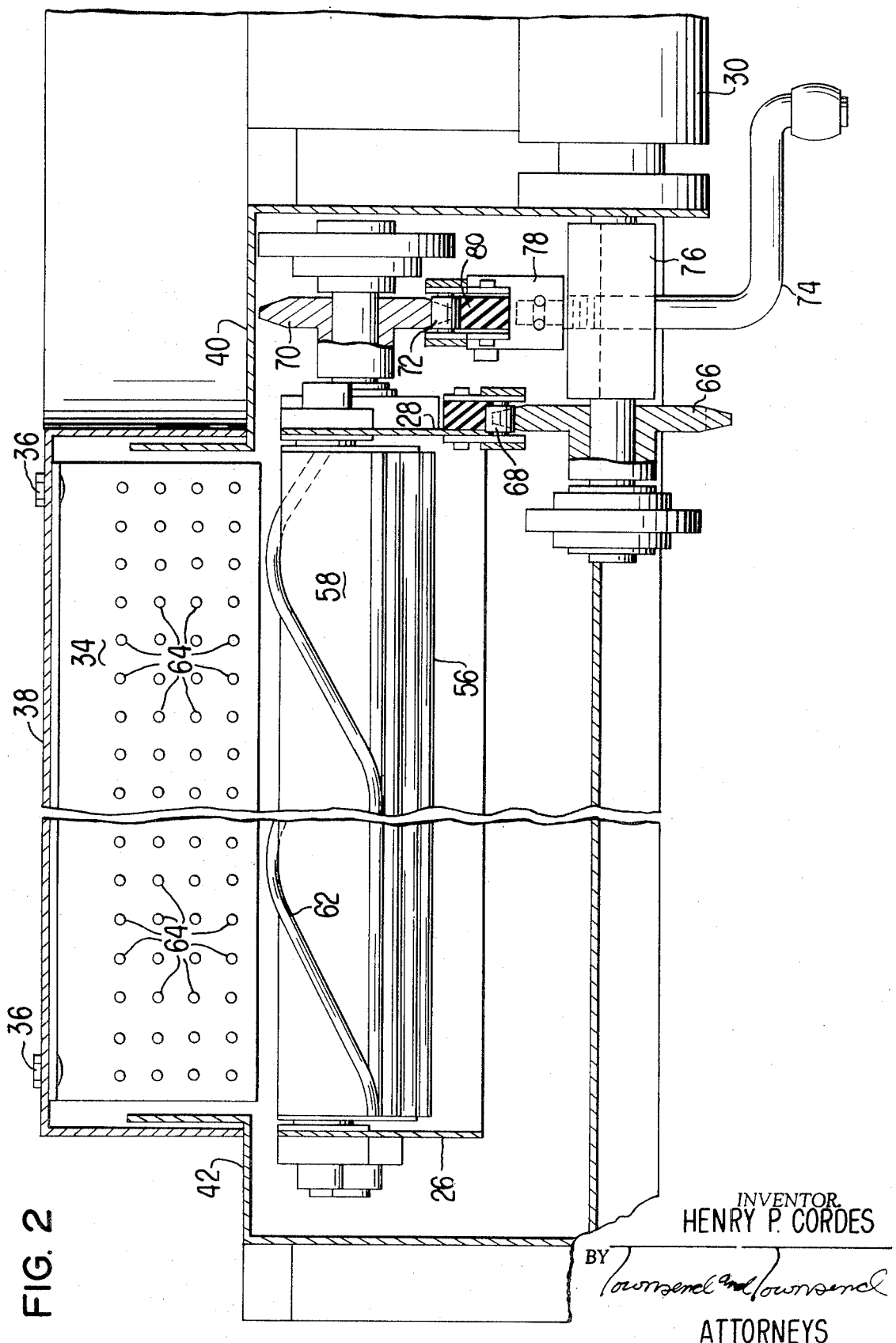
FIG. 2 is a cross section elevationed view of the invention shown of FIG. 1 taken transversely of the path of movement.

Referring to FIG. 2, rubber friction mat 34 suspended from cover 38 terminates just above the top of the stripping rolls. Protrusions 64 on the surface of mat 34 contact garlic bulbs, and the circular frame carries the pairs of stripping rolls 32 past the mats, the bulbs are gently rotated and reoriented so that all tops and root tendrils will eventually be caught in the resilient pressure area between the rolls and will be removed.

The circular frame is driven by drive sprockets 66 which are mounted on the shafts of motors 30 and which mesh with a drive track 68 carried on the lower edge of inner wheel 28. The large fluted stripping roll 56 is driven by sprocket 70 which is attached to the fluted roll and which meshes with a stationary chain 72. The smaller spirally wound roll 54 is driven by friction contact with fluted roll 56. The stationary chain 72 that engages sprocket 70 can be raised or lowered by hand cranks 74 which are positioned around the circular path. Each hand crank 74 is threadedly engaged with a stationary block 76 secured to the frame of the apparatus so that rotation of the crank causes the upper end of the crank to move vertically. Mounted on the upper end of each crank is a yoke 78; the totality of yokes support a flexible band 80 which lies circumjacent the circular path and supports chain 72. Thus it will be seen that when chain 72 is in an engaged or raised position, the stripping rolls rotate. When chain 72 is in a disengaged or lowered position, the stripping rolls do not rotate. Cranks 74 are preferably located around the periphery of the apparatus at about 18° intervals.

In the operation of the invention, garlic bulbs are lifted from windrows by inclined draper chains 18 which retain the garlic bulbs and allow the smaller soil particles to fall to the ground. The bulbs are then transferred by gravity onto incline powered roller grading tables 20 which carry the bulbs past inspectors as needed standing on platforms 22. Defective material, dirt clods, and other debris are removed by the inspectors and dropped to the ground. Additional dirt and debris fall between the bars and to the ground. The distance between the bars of these conveyors retain garlic bulbs of commercial value. At the top of incline grading tables 20 the garlic bulbs free of loose soil fall by gravity onto the circular frame that carries roll pairs 32 turning on a horizontal plane at a rate preferably requiring about 30 seconds to make a complete revolution. In one apparatus designed according to this invention the frame carries 60 adjacent pairs of stripping rolls counter rotating inwardly from the top. The rotational speed of these rolls is preferably about 50 r.p.m. The large roll 56 of each pair is 3½ inches in outside diameter and has a fluted resilient surface. The smaller roll 58 is 2 inches in diameter and is mounted about one-eighth inch from the outer surface of the fluted roll. The smaller roll is spirally wound with a resilient strip one-fourth inch high and one-half inch wide. This strip makes one revolution in about 15 inches along the roll surface; thus there is a compression area about 3 inches long separated from the next compression area at the same point by about 12 inches. Garlic bulbs seat themselves in the nip between the rolls where appendages such as tops and root tendrils are caught in the compression and are positively but gently pulled free from the bulb. Any clods of dirt are likewise reduced by attrition. Stationary perpendicular rubber friction mats 34 suspended above the rolls, contact the garlic bulbs intermittently and rearrange any bulbs which are not caught in the compression area. Normally five to six mats spaced the circular path of roll travel are sufficient, but any additional number can be added as necessary. Thus long before a given bulb has completed its revolution, it will be randomly rearranged so that any appendages will be caught in a compression area and pulled free from the bulb. Friction mats 34 are flexibly connected to cover plate 38 by fasteners 36. At Section 44 of FIG. 1, cover plate 38 has been removed exposing the stripping rolls. By turning selected cranks 74 shown in FIG. 2, sprockets 70 can be disengaged from the stationary chain track 72 thereby stopping the rotation of the stripping rolls in that area. This exposed safe area can be utilized as an inspection area where undesirable material can be removed by hand. At point 48 of FIG. 1, sprocket 70 can again be engaged by positioning appropriate cranks 74 to raise the stationary chain track 72 at that point to activate the stripping rollers.

In prior art mechanical topping equipment, each unit being treated is subjected to the action of the equipment during its entire time of residence on the rolls. In my invention, if it is observed that topping is completed before the circular frame has completed one revolution, the stripping roll sprockets can be disengaged from this point on. Thus any area of the circular path can be used (a) as an active top removal section, (b) as an inspection area with stationary stripping rolls, or (c) as a conveyor with stationary rolls. The amount of treatment required depends on many variables such as maturity of the tops, moisture of the bulbs, type of soil, moisture of soil, etc. The unit is so designed that even with the worst combination of conditions, the garlic will be adequately topped, and as conditions are more favorable, less treatment can be given, thereby improving quality by reducing bruising. The direction of the spiral winding on the small stripping rolls 58 gently works the garlic bulbs toward the outside of the wheel. When the treated bulbs reach the staggered rotating shunting brushes 50 they are gently pushed off the wheel where they fall by gravity onto conveyor belt or elevator 54 which carries the topped bulbs to a truck or portable storage area which moves through the field with the topping unit.

Thus it will be seen that the present invention provides apparatus for treating garlic bulbs that can conveniently drawn across a garlic field so as to remove unwanted fractions of garlic bulbs before they require further transportation or processing. Because of the ability to interrupt rotation of the stripping rollers at one or more points around the periphery of the apparatus, the invention permits optimum processing procedures irrespective of the size, type, or maturity of the garlic bulbs. Moreover, the covers over the circular path afford safety to inspectors and other workers but are removable to permit placement of the inspection stations at any desired location or locations around the periphery of the apparatus.

While one embodiment of the invention has been shown and described, it will be obvious that other adaptations and modifications can be made without departing from the true spirit and scope of the invention.

What is claimed is:

1. Apparatus for pulling appendages such as tops and root tendrils from garlic bulbs comprising first and second generally cylindric rolls, means for supporting said rolls in generally horizontal parallel-spaced-apart relation for rotation about their respective central axes, said rolls being spaced from one another a given distance, thereby forming a bulb-supporting pocket therebetween, said first roll having on the surface thereof a spirally wound deformable and compressible resilient strip, said strip projecting radially of said first roll by an amount in excess of said given distance so as to deform and to contact said second roll at a region of deformation on said strip and establish a driving connection between said rolls through said strip, means for rotatively driving one of said rolls so that said rolls rotate inwardly from the top, said region of contact between said strip and said second roll thereby travelling longitudinally of said rolls in response to rotation of said rolls, and means for delivering garlic bulbs to said bulb-supporting pocket, whereby the tops and root tendrils of said bulbs are engaged at the region of contact between said strip and said second roll and pulled downward and whereby said region of contact can deform to admit the tops and root tendrils therebetween.

2. Apparatus as in claim 1 including means for defining a generally horizontal path having an inlet station and an outlet station, and means for transporting said roll supporting means along said path from said inlet station to said outlet station.

3. Apparatus as in claim 2 wherein said roll driving means includes a stationary chain disposed below and parallel to said path and a sprocket attached to one of said rolls and enmeshed with said stationary chain.

4. Apparatus as in claim 3 in combination with a flexible band for supporting said chain and means for lowering selected portions of said chain to disengage said sprocket at selected locations on said path whereby rotation of said rolls is terminated during traverse over said selected locations.

5. Apparatus as in claim 2 wherein said path defining means includes a circular frame having inner and outer spaced apart concentric circular members, means for mounting said rolls radially of said frame in spanning relation between said inner and outer means, means for revolving said circular frame so that said rolls travel in a circular path, said outlet station being circumferentially spaced from said inlet station, a conveyor having a conveying reach extending within the inner members of said circular frame and a discharge end above said inlet station, said conveyor having an input end below said circular frame, and means for carrying the apparatus upon a field surface so that the input end of said conveyor picks up garlic bulbs resting on the field surface.

6. Apparatus as in claim 1 wherein said second roll has on the surface thereof a plurality of radial protrusions thereon that extend lengthwise of said roll, there being a valley intermediate each adjacent pair of protrusions, said rib projecting radially from said first roll by an amount sufficient to contact said protrusions and insufficient to contact said valleys thereby subjecting said tops and root tendrils to a continuously varying pulling force in response to rotation of said rolls.

* * * * *